(12) United States Patent
Avdokhin et al.

(10) Patent No.: US 10,209,604 B2
(45) Date of Patent: Feb. 19, 2019

(54) RESONANT ENHANCED FREQUENCY CONVERTER

(71) Applicant: IPG PHOTONICS CORPORATION, Oxford, MA (US)

(72) Inventors: Alexey Avdokhin, Southborough, MA (US); Oleksiy Andrusyak, Brighton, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

(21) Appl. No.: 14/687,243

(22) Filed: Apr. 15, 2015

(65) Prior Publication Data

US 2015/0249313 A1    Sep. 3, 2015

Related U.S. Application Data

(63) Continuation of application No. PCT/US2012/060545, filed on Oct. 17, 2012.

(51) Int. Cl.
*H01S 3/00* (2006.01)
*H01S 3/081* (2006.01)
*G02F 1/35* (2006.01)
*H01S 3/083* (2006.01)
*H01S 3/0941* (2006.01)
*H01S 3/067* (2006.01)

(52) U.S. Cl.
CPC .............. *G02F 1/353* (2013.01); *H01S 3/083* (2013.01); *H01S 3/0816* (2013.01); *H01S 3/09415* (2013.01); *H01S 3/0092* (2013.01); *H01S 3/06758* (2013.01)

(58) Field of Classification Search
CPC ... H01S 3/0092; H01S 5/0092; H01S 3/09415
See application file for complete search history.

(56) References Cited

U.S. PATENT DOCUMENTS

| | | | |
|---|---|---|---|
| 4,731,795 A * | 3/1988 | Clark | H01S 3/025 372/101 |
| 6,724,486 B1 * | 4/2004 | Shull | G02F 1/37 356/486 |
| 7,876,802 B2 * | 1/2011 | McDonagh | H01S 3/09415 372/29.021 |
| 2008/0219302 A1 * | 9/2008 | Nakayama | G02F 1/37 372/21 |
| 2010/0166025 A1 * | 7/2010 | Grapov | G02F 1/3534 372/5 |
| 2012/0224252 A1 * | 9/2012 | Chou | G02F 1/3501 359/328 |
| 2016/0344155 A1 * | 11/2016 | Mueller | H01S 3/1026 |
| 2017/0003572 A1 * | 1/2017 | Woll | G02F 1/353 |

* cited by examiner

*Primary Examiner* — Marcia Golub-Miller
(74) *Attorney, Agent, or Firm* — Yuri B. Kateshov, Esq.; Timothy J. King, Esq.

(57) ABSTRACT

A frequency converter for converting a single mode input beam at a fundamental frequency to an output beam at a converted frequency is configured with a plurality of spaced optical components defining a resonant cavity. The optical components shape the input beam with at least one beam waist in the cavity. The frequency converter further includes a non-linear crystal located within the cavity in either a divergent beam with a Rayleigh range smaller than a cavity round trip length so that a center of the crystal is spaced from the beam waist along a beam path, or in a collimated beam with a Rayleigh range greater than the cavity round trip length.

4 Claims, 3 Drawing Sheets

RESONANT ENHANCED FREQUENCY CONVERTER

BACKGROUND OF THE DISCLOSURE

Field of the Disclosure

The present disclosure relates to frequency conversion of laser radiation by means of non-linear interaction of laser radiation with a suitable non-linear crystal. In particular, the disclosure relates to an improved design of the external cavity for frequency conversion in which the optical power density inside the volume and at faces of the crystal is reduced so as to substantially increase the crystal's lifetime. Furthermore, the disclosure relates to the improved manufacturability of the external cavity for frequency conversion built with a standard, single set of optical components which can be used for a wide range of input powers.

Prior Art Discussion

As known, there are wavelengths that cannot be directly accessed with modern laser technology. Nonlinear frequency conversion techniques allow generating laser radiation at these wavelengths in the UV, visible and IR spectral ranges.

Conceptually, the term frequency conversion includes generation of second, third, fourth and higher order harmonics, sum frequency generation and other nonlinear processes leading to a change of frequency of laser light. Typically, the frequency conversion of a continuous wave ("CW") laser radiation requires a resonator with an internally placed nonlinear crystal due to a relatively low single pass conversion efficiency of the internal generation of the higher order harmonic generation by the nonlinear crystal. The most widely used configurations include intracavity and external cavity resonators provided with nonlinear crystals. This disclosure relates to the external cavity approach.

Referring to FIG. 1, a ring 4-mirror bowtie frequency converter 10, representative of a great variety of external ring cavity configurations, is frequently used due to its versatility and relative ease of implementation. The resonator 10 is configured with a non-linear ("NL") crystal 12 located in a beam waist between two concave mirrors M3, M4. The placement of crystal 12 in the beam's waist provides high frequency conversion efficiency. However, the crystal in this position suffers from high optical power density of the frequency-converted beam at the crystal's output face and inside the crystal's volume. As a result, during the conversion, high energy photons at the converted wavelength are incident on the output surface of crystal 12 and can degrade this surface, while a high power density around the beam waist can damage the bulk of crystal 12.

The damage to the output surface can be minimized, of course, by reducing the power density on the output surface via reducing the size of the waist. As the latter reduces, the beam divergence increases reducing optical power density on the output surface of the crystal. However, scaling down the beam waist increases an already high power density within the waist in the crystal which can initiate damage in the bulk of the crystal.

A few solutions improving the useful life of a NL crystal have been suggested. The most common solution has been to use a crystal with a large cross section and translate the crystal in a pre-defined pattern to expose a fresh area when one area is damaged. The crystal is replaced after there is no useable area left. Although this technique increases the useful lifetime of a single crystal, it does not address the fundamental aspects of the crystal damage and involves a bulky, complicated and costly mechanical motion mechanism.

A need therefore exists for a frequency converter resonator designed so that a NL crystal has a long useful life.

Besides the crystal useful life, the frequency conversion efficiency of the nonlinear crystal within the external converter resonator is another concern. The conversion efficiency critically depends on making the resonator impedance matched, among other factors. The impedance matching involves the optimization of cavity parameters (most commonly transmission of the input mirror) to maximize the coupling of light into the resonant cavity. Maximum coupling is obtained when the round trip losses of the converter (including frequency conversion) are equal to the transmission T of the coupling mirror M1. Referring again to FIG. 1, the resonator is impedance matched when the coefficient of transmission T of the mirror M1 substantially matches the single pass frequency conversion efficiency in crystal 12, provided other cavity losses are negligible.

It is impossible to achieve impedance matching of the converter resonator for different input powers using the same set of physical components, such as an input collimator, mirrors and crystal. As the input light power changes, it is necessary to change an NL crystal's length, and/or transmission of coupling mirror M1 and/or diameter of the input beam in order to keep the cavity impedance matched. Any of these modifications is not a simple operation and requires time and effort which increase the cost of manufacturing frequency converters.

A need, therefore, exists for a frequency convertor resonator designed with a set of elements easily adaptable to satisfy the impedance matching condition of the resonator in response to a wide range of input light powers without replacing any of the physical elements of the resonator.

SUMMARY OF THE DISCLOSURE

The present invention discloses a frequency convertor which operates with improved crystal's life and manufacturability.

In accordance with one aspect of the disclosure, the volume and input and output faces of a NL crystal are all optically unloaded which considerably prolongs the useful life of the crystal. Structurally, this aspect is realized by further disclosed resonator configurations.

In one of the configurations, the crystal is displaced from a traditional position within the resonator, in which the input beam is focused inside the crystal, to a position where the NL crystal is located beyond the beam waist. As a consequence, the power density inside the volume and at least on the output crystal face is substantially decreased compared to the traditional geometry.

The other configuration of the first aspect includes placing the NL crystal in a collimated beam within the resonator. Like in the previously disclosed embodiment, the power density of the incident and converted beams is reduced which increases the useful life of the crystal.

Modeling of various resonator configurations, as well as initial experimental data, demonstrate that conversion efficiency of a crystal in excess of 90% can be obtained from the disclosed converter with the crystal located in a divergent or collimated beam (on par with efficiency that is obtained from a traditional resonator with a crystal located in a beam waist). However, optical power density of the frequency-converted radiation at the crystal's output face and inside the crystal is at least an order of magnitude lower than in the similarly structured resonator with the crystal located in the beam waist. Accordingly, the lifetime of the disclosed frequency converter is significantly improved compared to frequency converter resonators with crystals located in the beam waist.

In accordance with another aspect of the disclosure the NL crystal is selectively placed in the divergent beam in multiple positions, corresponding to respective powers of input light at the fundamental frequency, in which the resonator is impedance matched and thus the nonlinear crystal operates at the maximum conversion efficiency.

The placement of the crystal may be realized manually or automatically. The automatic displacement involves moving the NL crystal along the divergent beam until the impedance matching condition of the resonator at the given power of input signal is achieved. The determination is realized by a closed loop feedback monitoring either one of or both the intensity of the output signal at the desired converted frequency and the intensity of the input signal reflected from the input mirror. Alternatively, for any given input power, the crystal may be positioned manually at one of discrete predetermined locations, which corresponds to maximum conversion efficiency for this power, without the use of a control circuit. In either case, the disclosed resonator is adapted to operate at optimal efficiency over a wide range of input light powers without replacing any of the mirrors and/or NL crystal. The possibility of using the same physical components of the resonator for different input powers facilitates manufacturing and exploitation of resonators.

BRIEF DESCRIPTION OF THE DRAWINGS

The above and other features and advantages of the invention will become more readily apparent from the following specific description accompanied with the drawings, in which.

SPECIFIC DESCRIPTION

Figure 2:
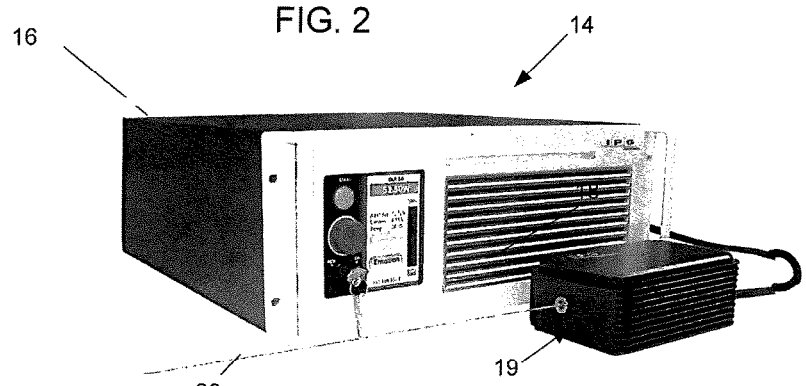
FIG. 2 is an isometric view of an exemplary continuous wave, single frequency, single mode laser system with the disclosed frequency converter.
Figure 3:
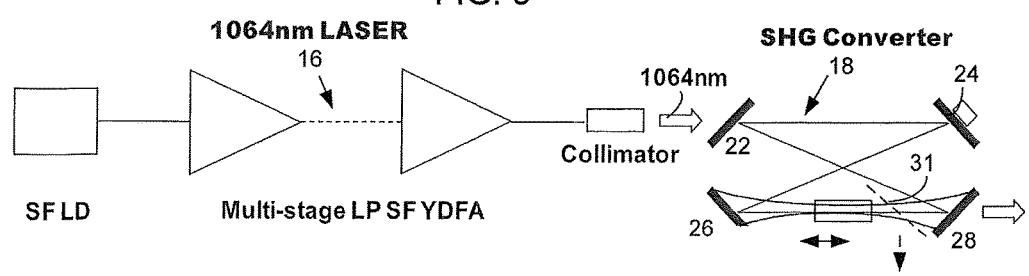
FIG. 3 is an optical schematic of the exemplary system of FIG. 2.

Reference will now be made in detail to the disclosed configuration. The fiber laser system of FIGS. 2 and 3 is illustrated exclusively as an example of any continuous wave, single frequency single mode laser system operating at the desired fundamental wavelength in conjunction with the disclosed resonator. The bow-tie geometry of the disclosed resonator is also exemplary and can be replaced by any ring-cavity configuration known to an artisan. Wherever possible, same or similar reference numerals are used in the drawings and the description to refer to the same or like parts or steps. The drawings are in simplified form and are not necessarily to the scale. For purposes of convenience and clarity only, the terms "connect," "couple," and similar terms with their inflectional morphemes do not necessarily denote direct and immediate connections, but also include connections through intermediate elements or devices.

The disclosed structure and method represent a modification to the traditional external cavity frequency converter resonator. This modification results in reduction of optical power density of the frequency-converted radiation at the output face and in the volume of a nonlinear crystal, which significantly slows down the rate of crystal degradation and improves the frequency converter's lifetime. This is achieved by shifting the nonlinear crystal inside the resonator away from the waist of the beam at the fundamental frequency to a location where this beam is divergent. In another embodiment the crystal is shifted to a location inside the resonator where the beam at the fundamental frequency is collimated.

FIGS. 2 and 3 illustrate an exemplary CW single frequency, single mode fiber laser system 14, disclosed in U.S. Prov. Application No. 61/584,395 and co-owned with the present application by common assignee. The system 14 includes a module 16, outputting a single mode ("SM") linearly polarized light at the desired fundamental wavelength in a 1 µm range, and a laser head 19. The module 16 is configured with, among others, a single frequency laser diode ("SFLD") outputting the signal light at a fundamental wavelength of about 1064 nm, and one or multiple linearly polarized single frequency ytterbium fiber pre-amplifiers. The laser head 19 includes a booster amplifier, collimator and a 2nd harmonic generation resonator outputting a green beam 20 at the wavelength of about 532 nm. While the fiber laser is preferred, other lasers, such as solid state, semiconductor, disk and other laser configurations, are fully incorporated within the scope of this disclosure.

Figure 4:
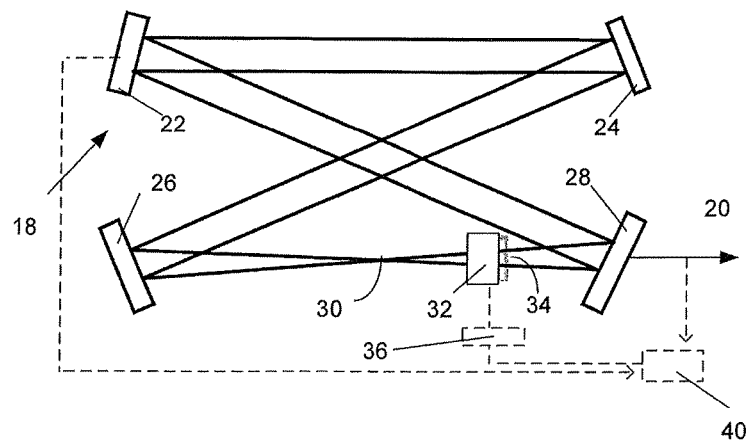
FIG. 4 is an optical schematic of one embodiment of the disclosed resonator.

Referring specifically to FIGS. 3 and 4, exemplary frequency converter 18 includes an input partially transmitting flat mirror 22 coupling collimated light at the fundamental frequency into the resonator, a first intermediary flat mirror 24, a concave mirror 26 and a concave output mirror 28 all defining a closed beam path. The concave mirror 26 focuses the incident collimated beam into a beam waist 30 where the beam diameter is the smallest. As readily understood by one of ordinary skill, the number of optical elements may vary, and the converted beam can be extracted from resonator 18 not only by mirror 28 but, alternatively, by any other optical element such as mirror 31 shown in dash lines in FIG. 3.

According to the prior art, the non-linear crystal is placed midpoint between concave mirrors 26 and 28 with the fundamental beam waist located inside the crystal. This position of the crystal 32 is characterized by a high optical power density of the converted light inside the volume of and on the output face 34 of crystal 32. The high power density can damage crystal bulk and/or face which limits the useful life of the converter.

According to the disclosure, crystal 32 is linearly displaced from beam waist 30 along the divergent beam towards output mirror 28. In the context of this disclosure, the divergent beam is a beam that has a Rayleigh range which is smaller than a cavity round trip in frequency converter 18. As a consequence, the optical power density of the frequency-converted radiation in the volume and at output face 34 of nonlinear crystal 32 can be substantially reduced thereby increasing the lifetime of non-linear crystal 32. If crystal 32 is further displaced, not only the volume and output face are under the reduced intensity, but also the input face of crystal 32 is unloaded.

The placement of crystal 32 in FIG. 4 is not arbitrary. For a wide range of input powers, the placement is determined so that for any given input power, the location of the crystal corresponds to impedance matching condition of resonator 18.

The desired placement of crystal 32 can be determined prior to the operation of frequency converter 18 provided the input power is known. In this case, the placement of the crystal may be realized manually. Alternatively, displacement of crystal 32 may be realized by any suitable actuator 36 along a divergent beam so as to meet the impedance matching condition, i.e., maximum frequency conversion efficiency of the crystal, for a wide range of input powers. In this case, the impedance matching condition for any input power can be determined by a closed loop circuitry. In particular, while displacing crystal 32, a sensor 40 detects the output frequency converted power, a maximum of which corresponds to the maximum conversion efficiency of the crystal for a given input power. Alternatively or in addition to the above, sensor 40 may also be used to monitor the power of the input beam reflected from input mirror 22 and utilize a feedback loop to minimize this power. This also corresponds to the impedance matching condition.

Figure 5:
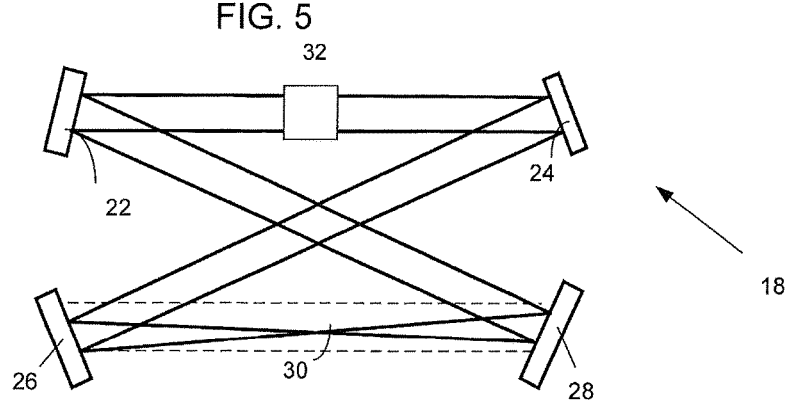
FIG. 5 is an optical schematic of another embodiment of the disclosed resonator.

FIG. 5 illustrates another embodiment of the disclosed frequency converter configured to reduce power density inside the volume and at the opposite faces of crystal 32. In particular, crystal 32 is placed in the collimated beam between input and intermediate mirrors 22 and 24, respectively. In the context of this disclosure, the collimated beam is a beam that has a Rayleigh range which is larger than a cavity round trip in resonant cavity 18. Accordingly, crystal 32 may be placed along any section of the beam path within cavity 18 including beam waist 30. The embodiment shown in this figure, like in FIG. 4, is exemplary and can be configured with three, four or more optical components as long as there is at least one focusing optical element that compensates for the natural divergence of a collimated beam.

Figure 1:
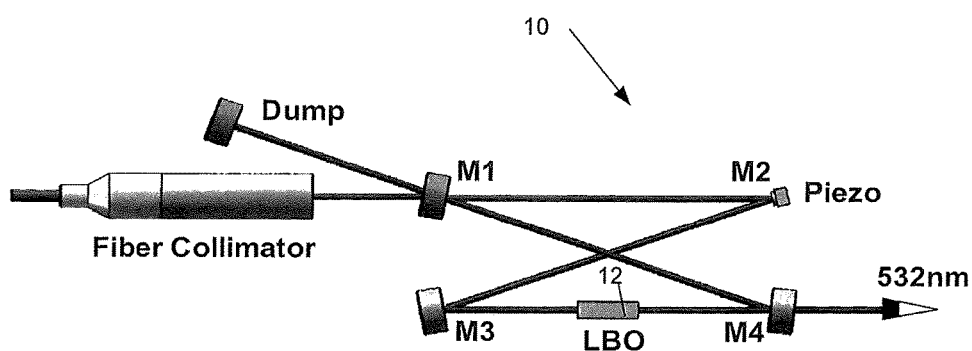
FIG. 1 is an optical schematic of a traditional external cavity converter resonator.

The experimental data obtained with the disclosed resonator shows conversion efficiency of the nonlinear crystal in excess of 90%. Furthermore, the disclosed resonator is configured so that optical power density of the frequency-converted radiation at the crystal's output face and inside the crystal is at least an order of magnitude lower compared to traditional resonator 10 of FIG. 1. It means that the lifetime of frequency converters with crystals located in a divergent or collimated beam will be significantly improved compared to frequency converters with crystals located in the beam waist.

Figure 6:
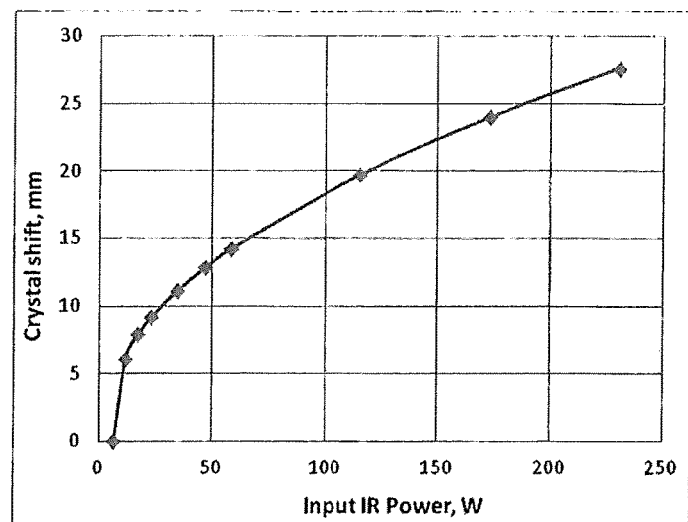
FIG. 6 shows the crystal shift required to achieve the impedance matching condition for a given input power in an exemplary frequency converter designed to convert 1064 nm input radiation to 532 nm converted radiation via second harmonic generation ("SHG") in an LBO crystal.

The general concept discussed above can be illustrated based on the specific example of a frequency converter designed to convert 1064 nm input radiation to 532 nm radiation via second harmonic generation ("SHG") in an LBO crystal. In particular, FIG. 6 shows the crystal shift required to achieve the impedance matching condition for this specific converter for a given input power.

Figure 7:
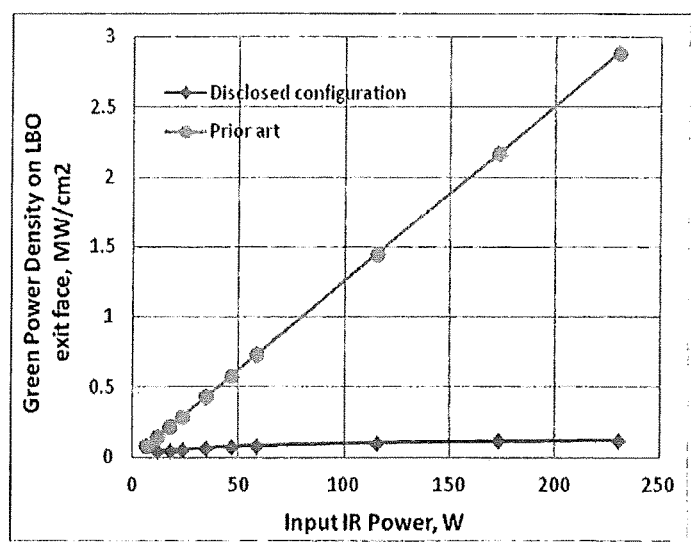
FIG. 7 illustrates power density of frequency converted radiation on exit face of nonlinear crystal for a range of input powers in the disclosed configuration compared to the known prior art configuration.

For the same exemplary frequency converter discussed above, FIG. 7 illustrates the power density of the frequency converted radiation on the exit face of the nonlinear crystal for a range of input powers in the disclosed configuration compared to the known prior art configuration. Referring to FIG. 7, it is important to note that the disclosed and prior art configurations are both impedance matched for each point within the shown range of input powers.

As shown in FIG. 7, the power density at the exit crystal face does not significantly vary over a wide range of input powers for the disclosed configuration. While the input IR power increases from 12 W to about 230 W, i.e., about 20 times, the crystal is displaced further away from the beam waist. At the same time, the green power density at the exit crystal face increases by about mere 2.8 times. In contrast, the green power density in the prior art configuration grows linearly by about 20 times as the input power increases.

The following table I provides a comparison between two configurations impedance matched for 230 W input IR power (utmost right points in FIG. 7). The two configurations feature the identical efficiency and output power. However, as can be seen, not only the green power density on the exit face is decreased, but also both IR and green power densities inside the volume of crystal 32 are substantially decreased in the disclosed configuration. The decreased power density in the bulk material relaxes the requirements for crystal purity. The latter, of course, represents an additional advantage of the disclosed configuration.

TABLE I

|  | Known art with crystal in beam waist | Disclosed resonator with crystal shifted |
| --- | --- | --- |
| Maximum IR power density inside LBO, MW/cm2 | 22 | 3.1 |
| Maximum green power density inside LBO, MW/cm2 | 13 | <0.3 |
| Green power density on exit face of LBO, MW/cm2 | 2.9 | 0.12 |

In summary, the power density of light at both the fundamental and converted frequencies reduces inside the crystal as it moves farther away from the waist. Similarly, the power density of the converted frequency at the exit face of the crystal lowers with the distance between the crystal and waste.

While the above discussion uses second harmonic generation as an example, it is important to note that the disclosed configuration can be used for other frequency conversion processes. These include third, fourth and higher order harmonic generation, sum frequency generation and other nonlinear processes leading to a change of frequency of laser light.

Structurally, the disclosed frequency converter may include multiple disclosed resonators that are coupled in series for third, fourth or higher order harmonic generation, or other non-linear frequency conversion.

In summary, CW single-mode single-frequency fiber laser incorporating the above disclosed frequency converter has been demonstrated to output several hundred watts at a converted wavelength and operate at 25% and higher electrical-to-optical efficiency. With the disclosed cavity optimization, the output power at a converted frequency is limited only by the fundamental fiber laser power and even today can reach a kW-level. The useful life of a NL crystal for the disclosed resonator is substantially longer than that of the crystal in the traditional configuration. The ability to adjust the disclosed resonator to provide high frequency conversion efficiency at different powers without a need for replacing any of the physical components is highly advantageous for the manufacturing process. The crystal 32 can be selected in response to given requirements and thus may include any non-linear crystal (for example, lithium triborate (LBO), barium borate (BBO), potassium titanyl phosphate (KTP), potassium di*deuterium phosphate (KD*P), potassium dihydrogen phosphate (KDP) and others).

Having described at least one of the preferred embodiments of the present invention with reference to the accompanying drawings, it is to be understood that the invention is not limited to those precise embodiments. The configuration of resonators is not limited to those shown and discussed above. For example, the resonator may not only be unidirectional, but also it may be bi-directional. Thus various changes, modifications, and adaptations may be effected therein by one skilled in the art without departing from the scope or spirit of the invention as disclosed above.

The invention claimed is:

1. An optical system comprising:
    a continuous wave (CW) single frequency (SF) coherent laser source emitting a single mode ("SM") beam at a fundamental frequency, the SM beam having an optical power output selected from a range of optical powers;
    a collimator configured to collimate the SM beam downstream from the source;
    an enhancement resonator for generating higher order harmonic from SM beam located external to the CW SF source and configured with:
        a plurality of optical components including an input coupler, which is configured with a transmission coefficient, a portion of the collimated SM beam, which is coupled into the enhancement resonator, having a beam waist and divergent section, which has a Rayleigh range smaller than a round trip length of the enhancement resonator, and
        a non-linear crystal displaceable within the resonator along the divergent section among a plurality of locations, which correspond to respective optical power outputs of the SM beam, such that at each location the enhancement resonator is impedance matched and operates at a maximum conversion efficiency.

2. The optical system of claim 1, wherein the CW SF source includes a fiber laser or semiconductor laser or solid state laser or gas laser.

3. The optical system of claim 1 further comprising:
    a laser head spaced from the CW SF source,
    a booster fiber amplifier amplifying the SM beam at the fundamental frequency and mounted in the laser head along with the enhancement resonator, and
    a fiber cable coupling the CW SF source and booster.

4. A frequency converter for converting a single mode (SM) input beam, which is emitted from an external laser light source at a fundamental frequency and has an optical power selected from a predetermined range of optical powers, to an output beam at a converted frequency, comprising:
    an enhancement resonant cavity including an input coupler configured with a coefficient of transmission of the input beam, which is incident on the input coupler, and shaping the transmitted input beam, the shaped transmitted input beam propagating in the enhancement resonant cavity having at least one beam waist and a divergent section in the enhancement resonant cavity, wherein the divergent section of the shaped transmitted input beam has a Rayleigh range smaller than a round trip length of the cavity; and
    a non-linear crystal selectively displaceable among a plurality of locations, which correspond to respective optical powers of the SM input beam, within the cavity in the divergent beam section of the shaped transmitted input beam, such that the enhancement resonant cavity is impedance matched at each of the locations and operates with a maximum conversion efficiency over the predetermined range of optical powers.

* * * * *